US008433318B2

(12) United States Patent
Krishnamoorthy et al.

(10) Patent No.: US 8,433,318 B2
(45) Date of Patent: Apr. 30, 2013

(54) SELECT BAND-SCANNING BY A MULTI-SIM USER EQUIPMENT (UE) IN A WIRELESS COMMUNICATIONS SYSTEM

(75) Inventors: Sathish Krishnamoorthy, Andhra Pradesh (IN); Uttam Pattanayak, Andhra Pradesh (IN); Ajit Gupta, Andhra Pradesh (IN); Suresh Sanka, Andhra Pradesh (IN); Asimava Bera, Andhra Pradesh (IN)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 13/086,522

(22) Filed: Apr. 14, 2011

(65) Prior Publication Data

US 2012/0264425 A1 Oct. 18, 2012

(51) Int. Cl.
*H04W 24/00* (2009.01)
(52) U.S. Cl.
USPC .......................................................... 455/434
(58) Field of Classification Search .................. 455/436, 455/435.1–435.2, 450, 558, 422.1, 426.1, 455/550.1, 432.1, 408, 411, 404.1, 404.2, 455/446, 466; 370/342, 338, 339
See application file for complete search history.

(56) References Cited

U.S. PATENT DOCUMENTS

| | | | |
|---|---|---|---|
| 7,596,378 B1 | 9/2009 | Nizri et al. | |
| 2005/0079870 A1 | 4/2005 | Rick et al. | |
| 2005/0176466 A1* | 8/2005 | Verloop et al. | 455/558 |
| 2006/0178153 A1 | 8/2006 | Tenny et al. | |
| 2009/0215452 A1 | 8/2009 | Balasubramanian et al. | |
| 2009/0239584 A1* | 9/2009 | Jheng et al. | 455/558 |
| 2009/0270072 A1* | 10/2009 | Hsu et al. | 455/411 |
| 2009/0270130 A1* | 10/2009 | Lee et al. | 455/558 |
| 2009/0298459 A1* | 12/2009 | Saini et al. | 455/404.1 |
| 2009/0312020 A1* | 12/2009 | Lee | 455/435.2 |
| 2010/0105433 A1* | 4/2010 | Lin et al. | 455/558 |
| 2010/0255843 A1 | 10/2010 | Huang et al. | |
| 2010/0279698 A1* | 11/2010 | Wong | 455/450 |
| 2010/0311444 A1 | 12/2010 | Shi et al. | |
| 2011/0217969 A1* | 9/2011 | Spartz et al. | 455/422.1 |

FOREIGN PATENT DOCUMENTS

| | | |
|---|---|---|
| EP | 1722581 A1 | 11/2006 |
| EP | 2302971 A2 | 3/2011 |
| EP | 2437529 A1 | 4/2012 |

OTHER PUBLICATIONS

International Search Report and Written Opinion—PCT/US2012/033131-ISA/EPO—Jul. 26, 2012.

* cited by examiner

*Primary Examiner* — Melody Mehrpour
(74) *Attorney, Agent, or Firm* — Rupit M. Patel

(57) ABSTRACT

In an embodiment, a wireless communications device (WCD) is provisioned with a plurality of subscriber identity modules (SIMs). The WCD determines a first set of bands (BAND1) that is associated with a first SIM and a second set of bands (BAND2) associated with a second SIM. In a first embodiment, the WCD generates a combined band for the first and second SIMs and then scans the combined band to detect a set of target networks for camping in association with at least the first and second SIMs. In a second embodiment, the WCD scans BAND1 to detect a first set of target networks for camping in association with the first SIM, and then excludes, from the BAND2, bands that overlap with BAND1. The WCD then scans the reduced BAND2 to detect to detect a second set of target networks for camping in association with the second SIM.

36 Claims, 10 Drawing Sheets

SELECT BAND-SCANNING BY A MULTI-SIM USER EQUIPMENT (UE) IN A WIRELESS COMMUNICATIONS SYSTEM

BACKGROUND

1. Field of the Invention

Embodiments of the invention relate to selective band-scanning by a mobile communications device that includes multiple subscriber identity modules (SIMs) in a wireless communications system.

2. Relevant Background

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal FDMA (OFDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interacts with UEs through an over the air interface and with the RAN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as W-CDMA, CDMA, FDMA, TDMA, GSM, etc. In a dispatch model, communication between endpoints (e.g., UEs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

SUMMARY

In an embodiment, a wireless communications device (WCD) is provisioned with a plurality of subscriber identity modules (SIMs). The WCD determines a first set of bands (BAND1) that is associated with a first SIM and a second set of bands (BAND2) associated with a second SIM. In a first embodiment, the WCD generates a combined band for the first and second SIMs and then scans the combined band to detect a set of target networks for camping in association with at least the first and second SIMs. In a second embodiment, the WCD scans BAND1 to detect a first set of target networks for camping in association with the first SIM, and then excludes, from the BAND2, bands that overlap with BAND1. The WCD then scans the reduced BAND2 to detect to detect a second set of target networks for camping in association with the second SIM.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
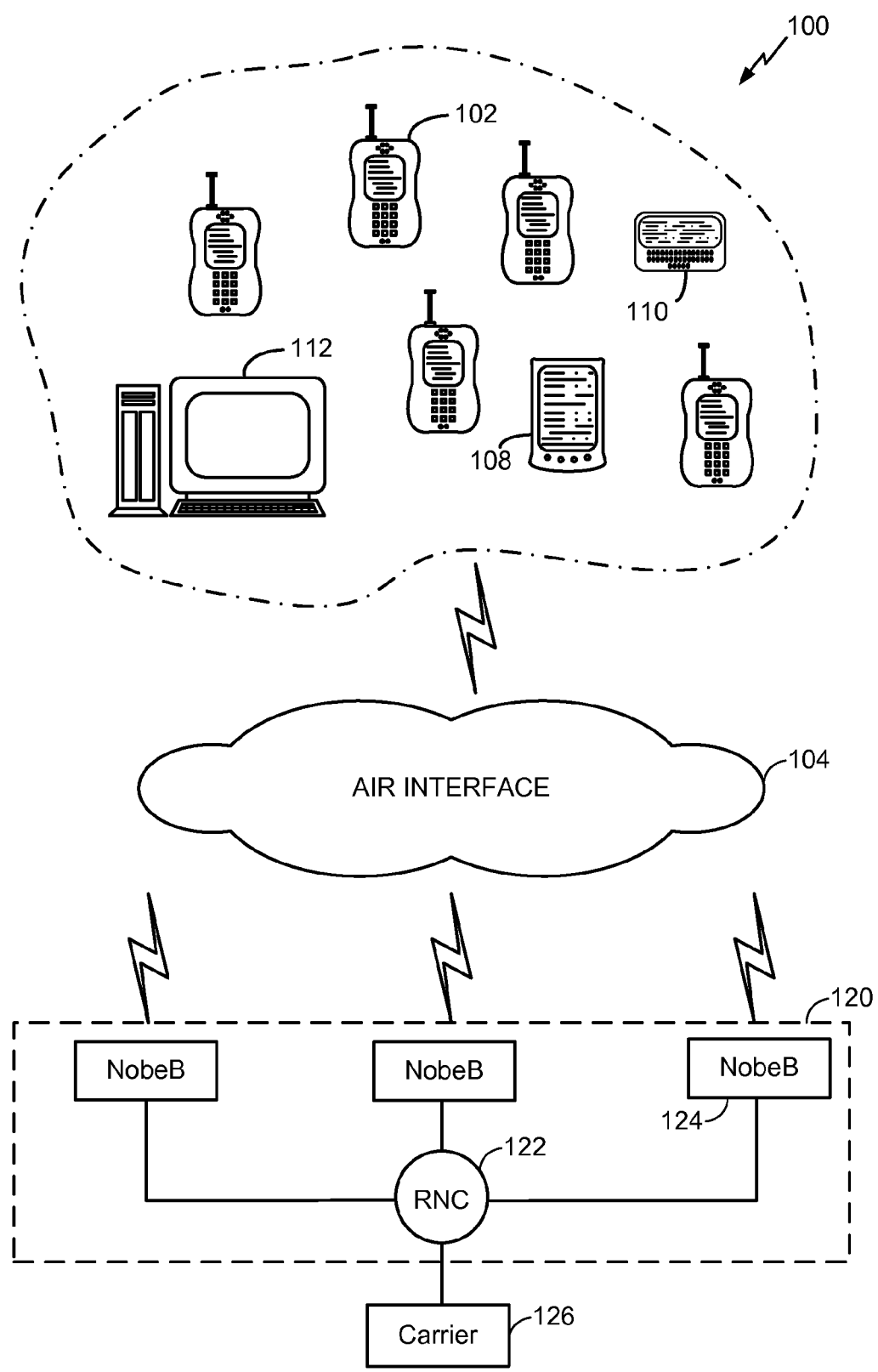
FIG. 1 is a diagram of a wireless network architecture that supports user equipments and radio access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration."

Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple UEs.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
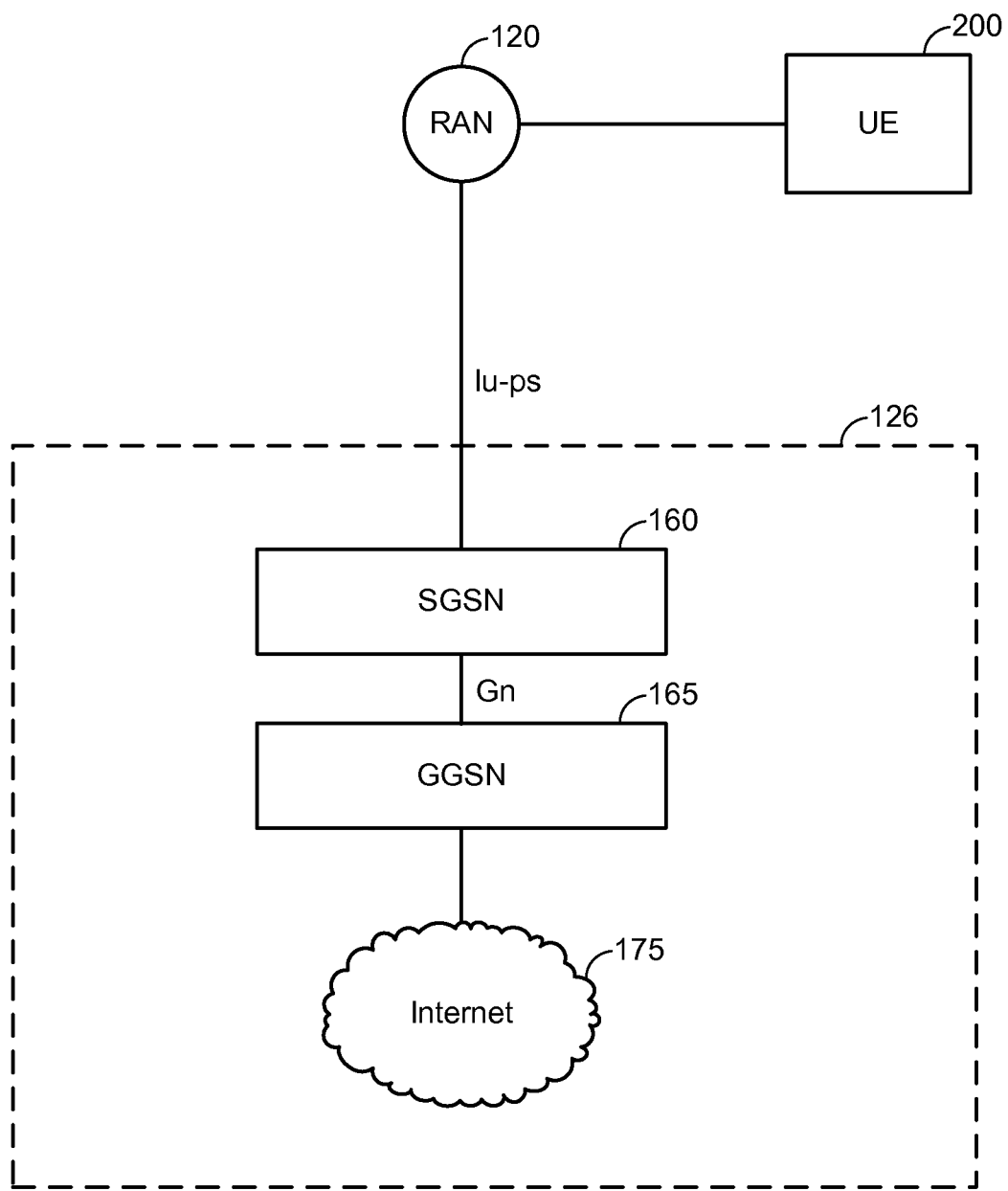
FIG. 2A illustrates the core network of FIG. 1 according to an embodiment of the present invention.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., access terminals) of a GSM or W-CDMA network to move from place to place while continuing to connect to the internet as if from one location at the GGSN 165. This is achieved transferring the subscriber's data from the subscriber's current SSGN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Iu interface, with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2B:
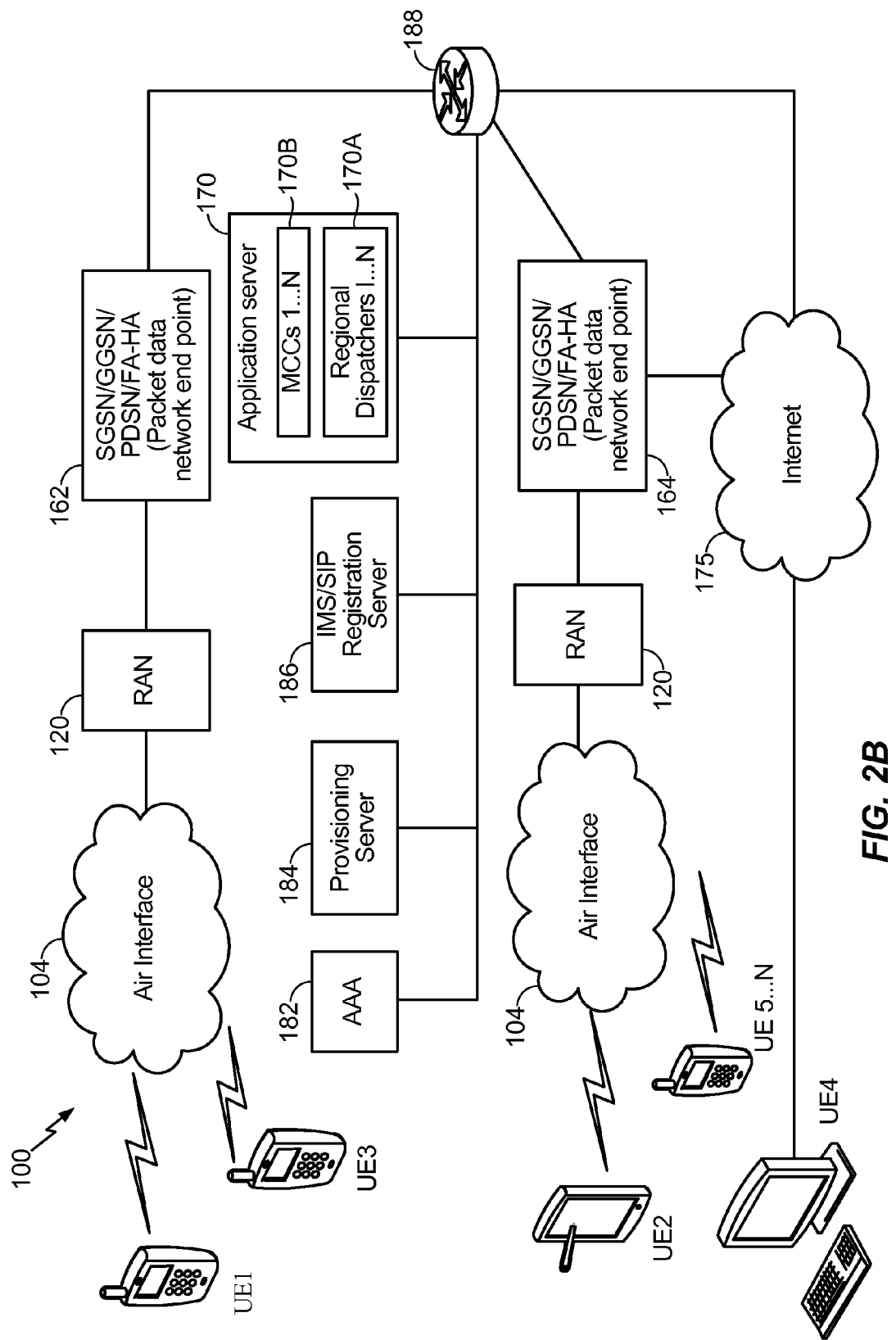
FIG. 2B illustrates an example of the wireless communications system of FIG. 1 in more detail.

FIG. 2B illustrates an example of the wireless communications system 100 of FIG. 1 in more detail. In particular, referring to FIG. 2B, UEs 1 . . . N are shown as connecting to the RAN 120 at locations serviced by different packet data network end-points. The illustration of FIG. 2B is specific to W-CDMA systems and terminology, although it will be appreciated how FIG. 2B could be modified to confirm with a 1x EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2B, UEs 1, 3 and 5 . . . N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2B are not intended to limit the types of UEs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
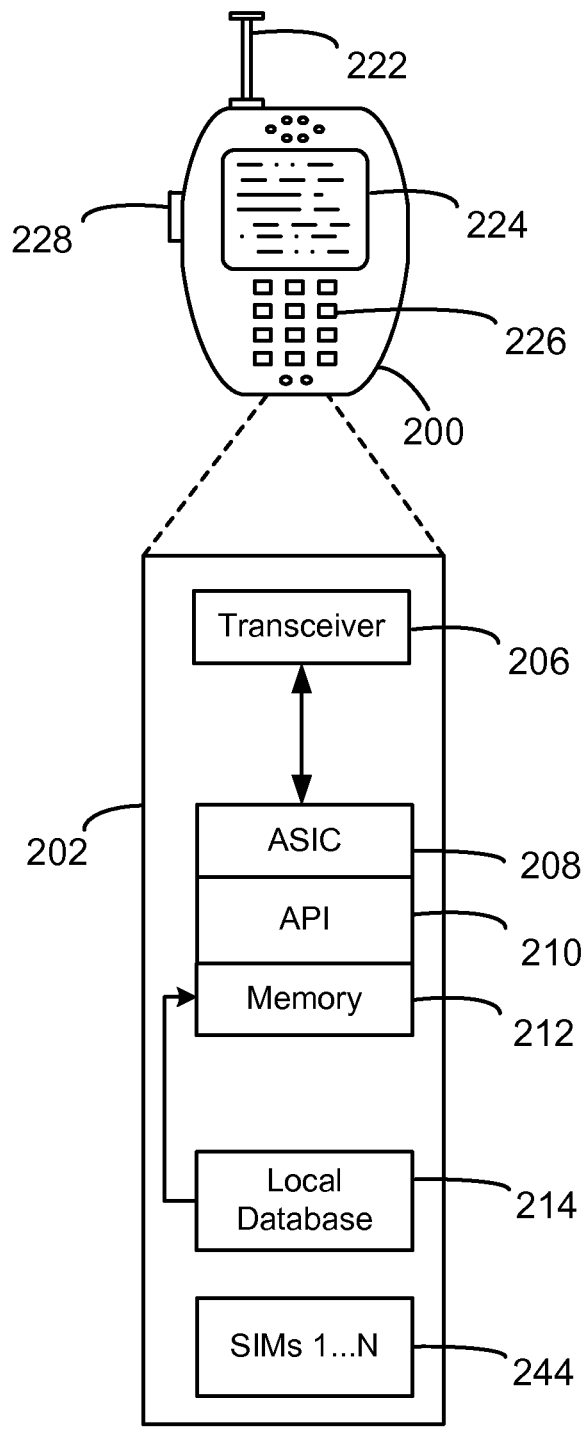
FIG. 3 is an illustration of user equipment in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

Further, UE 200 is shown as including a plurality of subscriber identity modules (SIMs) 1 . . . N, 244. Thus, UE 200 corresponds to a multi-SIM UE, as will be described in more detail below.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Below, embodiments of the invention are generally described in accordance with W-CDMA protocols and associated terminology (e.g., such as UE instead of mobile station (MS), mobile unit (MU), access terminal (AT), etc., RNC, contrasted with BSC in EV-DO, or Node B, contrasted with BS or MPT/BS in EV-DO, etc.). However, it will be readily appreciated by one of ordinary skill in the art how the embodiments of the invention can be applied in conjunction with wireless communication protocols other than W-CDMA.

Conventionally, when a given UE is in an idle mode, the given UE attempts to 'camp' on the most appropriate cell of a given public land mobile network (PLMN) (e.g., a CDMA or W-CDMA network, an EV-DO network, a TDMA network, a GSM network, etc.), and register in the PLMN via that cell. When the given UE is camped to a particular cell of a particular PLMN, the given UE tunes to the cell's control channels in order to receive paging and broadcast signals.

As an example, the GSM family of standards, and in particular, GSM standard 03.22, which is incorporated herein by reference in its entirety, defines idle mode operation in terms of three major, interrelated processes: (1) selection of a PLMN; (2) cell selection and reselection; and (3) location updating. In the protocol stack defined by GSM standards for signaling between the given UE and Node B, these idle mode functions are carried out by a radio interface protocol layer 3 (RIL-3). Within this layer, the cell selection/reselection process is carried out by a radio resource management (RR) sub-layer; and the PLMN selection and location updating processes are carried out by a mobility management (MM) sub-layer.

Each time the given UE enters the idle mode (e.g., upon power-up of the given UE, when the given UE is Out-of-Service (OOS), etc.), the given UE scans a given set of bands that are associated with a Subscriber Identity Module (SIM) of the given UE to detect PLMN Identifiers (IDs). The given UE then selects a PLMN associated with one of the detected PLMN IDs, and attempts to camp on a cell of the selected PLMN. The particular PLMN to be camped on may be selected either manually or automatically, according to a predefined order of priorities. The cell selection procedure verifies that the given UE is camped on a suitable cell of the selected PLMN, whereby the given UE will be expected to be able to reliably receive and decode data and in which the given UE is likely to be granted access to call resources when initiating a call.

After selecting the PLMN, cell selection within the PLMN may be based on a general search of all possible Node B channels, or it may be aided by reference to a stored list of cells and/or cell signal strength measurements made while the given UE was in dedicated mode or Radio Resource Control (RRC)-connected mode. Alternative mechanisms of cell selection, given in GSM terminology, can include Normal Cell Selection (e.g., wherein the given UE searches all channels in all supported bands of operation), Stored List Cell Selection (e.g., wherein the search is based on a stored list of cells in order to speed up the initial cell selection) and Choose Cell Selection (e.g., wherein the given UE uses measurements made in dedicated mode in order to speed up cell selection after call termination). Once the given UE has selected and camped on the appropriate cell of the selected PLMN, the given UE sends a location update message to the Node B so as to register its location with the selected PLMN.

While camped on a given cell, the given UE monitors signals received from the given cell, as well as the signals from neighboring cells. If a cell change is indicated, for example, because the signal from one of the neighboring cells is stronger than that of the current cell, or because of network conditions and priorities, cell reselection is invoked, followed by location update as required. If the given UE loses contact with the current cell (i.e., the given UE is Out-of-Service or OOS), cell selection and, if necessary, PLMN scanning and selection are likewise invoked.

If no suitable cell is found or the given UE is not permitted to receive service (if, for example, the GSM subscriber SIM is not properly inserted, or the network rejects a location update request), the given UE enters a limited service mode. In limited service, the given UE attempts to camp on any cell that will allow it to make emergency calls, irrespective of its PLMN identity. Although the above description refers specifically to GSM standards and TDMA operation, handover and idle mode functions are a part of other cellular systems and standards, as well (e.g., CDMA, TDMA, etc.).

The above-description of conventional idle mode operation for the given UE is described with respect to one particular SIM that is associated with the given UE. However, it is becoming more common for UEs to be deployed with multiple SIM cards (e.g., dual-SIM cellular telephones, triple-SIM cellular telephones). UEs with multiple SIMs or SIM cards ("multi-SIM UEs") can be allocated multiple phone numbers, with each SIM capable of supporting a different phone number by which a given multi-SIM UE can be reached.

Figure 4A:
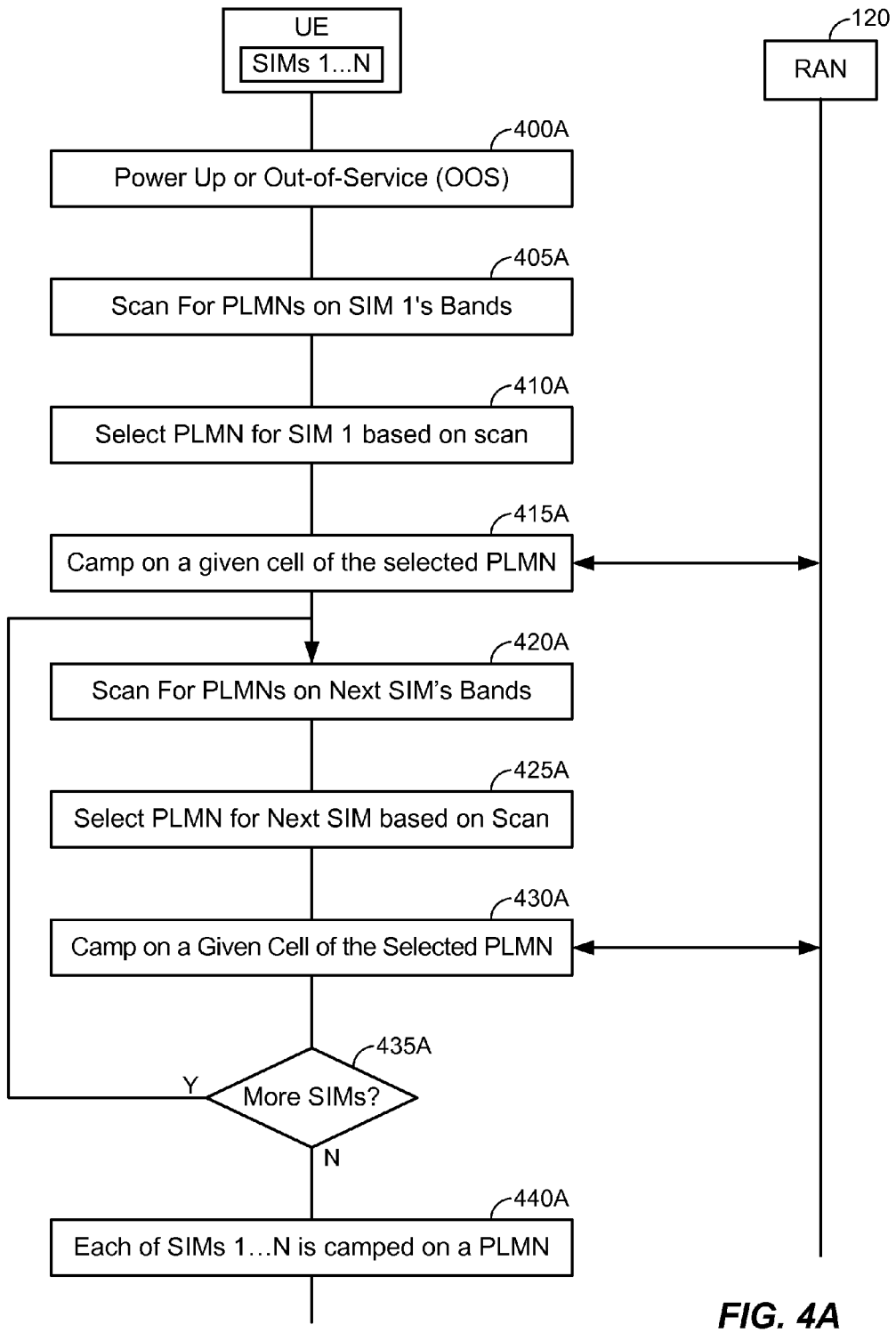
FIG. 4A illustrates a conventional Public Land Mobile Network (PLMN) camping process for a user equipment (UE) provisioned with a plurality of Subscriber Identity Modules (SIMs).

Accordingly, FIG. 4A illustrates a conventional PLMN camping process for a UE provisioned with a plurality of SIMs 1 . . . N. Referring to FIG. 4A, it may be assumed that N>1. Referring to FIG. 4A, it may also be assumed that the UE enters into idle mode and that the UE is not currently camped on PLMN(s) of the RAN 120 for any of SIMs 1 . . . N, 400A. For example, the UE's entry into idle mode in 400A can be the result of an initial power-up procedure by the UE, or alternatively as a result of an Out-of-Service (OOS) condition (e.g., the UE loses contact with a current cell on which the UE was camped).

After 400A, the given UE initiates a camping procedure by which the given UE attempts to camp on a given cell of a given PLMN for each of SIMs 1 . . . N. The camping procedure is performed in an iterative or sequential manner for each of SIMs 1 . . . N. Accordingly, the given UE scans one or more bands within its local wireless environment for signals advertising PLMNs that are associated with SIM 1 among SIMs 1 . . . N, 405A. For example, each of SIMs 1 . . . N can be associated with a given set of bands that are associated with PLMNs that are configured to support that particular SIM. As a further example, the given set of bands can be determined by the given UE via a query to a storage register within the non-volatile memory of the UE. The given set of bands for SIMs 1 . . . N can be provisioned per subscription (i.e., or per-SIM) in the non-volatile memory of the UE by the carriers, e.g., during or after activation of a particular SIM. The respective carriers for SIMs 1 . . . N can either provision the respective SIMs with different sets of bands (although the bands could overlap somewhat), or with identical sets of bands. After obtaining the given set of bands for SIM 1, the given UE can then scan or monitor the given set of bands in an attempt to detect PLMN IDs that are indicative of available PLMNs for SIM 1, as shown above in 405A.

After scanning the given set of bands for SIM 1, the given UE selects one of the detected PLMNs on which to attempt camping for SIM 1, 410A. The PLMN that is selected in 410A can be selected either manually or automatically, according to a predefined order of priorities. For example, instead of simply selecting the PLMN having a pilot or beacon signal with the highest signal strength, the given UE can be configured to select a PLMN by searching for PLMNs in a particular order (e.g., first CDMA, then EV-DO, etc.) and selecting the first PLMN, in the predefined order, that satisfies a threshold level of signal strength and/or cell quality. After selecting the PLMN in 410A, assume that the given UE successfully camps SIM 1 on the selected PLMN, 415A. While not shown explicitly in FIG. 4A, the camping procedure in 415A can include selecting a cell within the selected PLMN on which to camp for SIM 1, sending a location update to the selected PLMN and/or other camping operations. After 415A, the camping procedure with respect to SIM 1 is complete and SIM 1 is successfully camped on the selected PLMN from 410A. Accordingly, the iterative camping procedure for SIMs 1 . . . N continues with respect to the next SIM, which in this case is SIM 2.

Accordingly, the given UE scans one or more bands within its local wireless environment for signals advertising PLMNs that are associated with SIM 2, 420A. The given set of bands associated with SIM 2 can be obtained in a manner that is similar to the manner described above by which the set of bands for SIM 1 are obtained. After obtaining the given set of bands for SIM 2, the given UE can scan or monitor the given set of bands in an attempt to detect PLMN IDs that are indicative of available PLMNs for SIM 2, as shown above in 420A. As will be discussed below in greater detail, it is possible that the set of bands for SIM 1 that are scanned in 405A overlap at least partially with the set of bands for SIM 2 that are scanned in 420A. Thus, at least a portion of the scanning of 420A can be said to be redundant in the sense that the camping procedure for SIMs 1 . . . N is scanning the same bands to detect PLMNs for two different SIMs.

After scanning the given set of bands for SIM 2, the given UE selects one of the detected PLMNs on which to attempt camping for SIM 2, 425A. The selection of 425A for SIM 2 can be similar to the selection of 410A for SIM 1. However, it is possible that SIM-specific PLMN-selection rules can result in a different PLMN being selected for SIM 2 in 425A as compared to the PLMN that was selected for SIM 1 in 410A.

After selecting the PLMN in 425A for SIM 2, assume that the given UE successfully camps SIM 2 on the selected PLMN, 430A. While not shown explicitly in FIG. 4A, the camping procedure in 430A can include selecting a cell within the selected PLMN on which to camp for SIM 2, sending a location update to the selected PLMN and/or other camping operations. After 430A, the given UE determines whether any additional SIMs among SIMs 1 . . . N require camping, 435A. If the given UE determines that one or more additional SIMs among SIMs 1 . . . N require camping in 435A, the iterative camping procedure for SIMs 1 . . . N continues by returning to 420A for the next SIM, which in this case is SIM 3. Otherwise, if the given UE determines that no additional SIMs among SIMs 1 . . . N require camping in 435A, then each of SIMs 1 . . . N is camped on a respective PLMN, 440A.

As will be appreciated from the description of FIG. 4A, the iterative manner in which bands are scanned to detect PLMNs for the plurality of SIMs 1 . . . N can result in overlapping or redundant scans of bands for PLMNs, which increases delays associated with the camping procedure and also increases power consumption by the given UE.

Figure 4B:
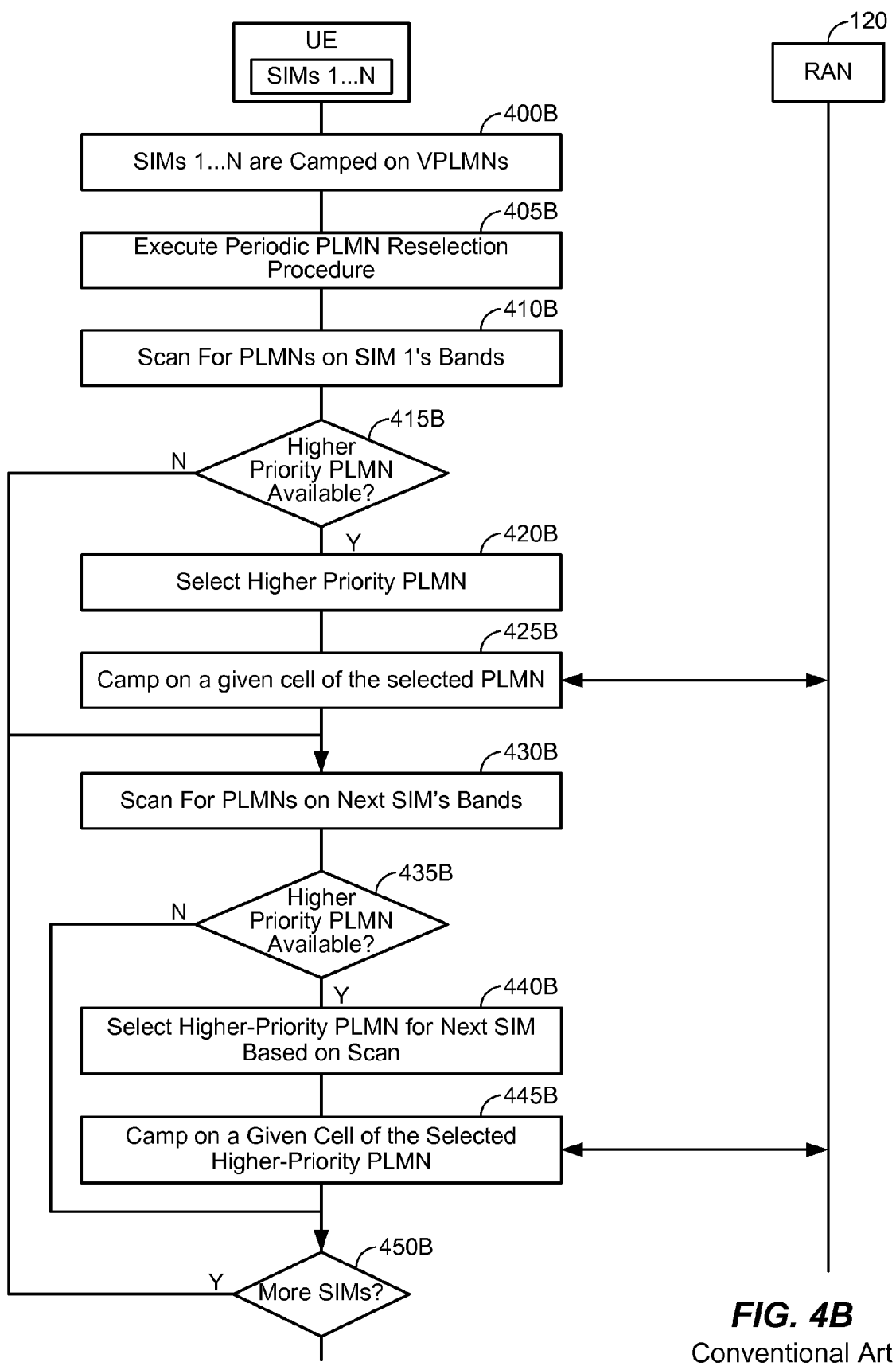
FIG. 4B illustrates a conventional PLMN reselection process for a UE provisioned with a plurality.

While FIG. 4A describes a conventional process relating to a camping procedure for SIMs 1 . . . N upon PLMNs when the SIMs 1 . . . N are not yet camped on any PLMN, it will be appreciated that the given UE can continue to scan for PLMNs even when SIMs 1 . . . N are each already camped on PLMN(s). Accordingly, FIG. 4B illustrates a conventional PLMN reselection process for a UE provisioned with a plurality of SIMs 1 . . . N. As in FIG. 4A, in FIG. 4B, it may be assumed that N>1.

Referring to FIG. 4B, unlike 400A of FIG. 4A, assume that the UE is currently camped on PLMNs of the RAN 120 for each of SIMs 1 . . . N, 400B. However, in 400B, further assume that each of the PLMNs on which SIMs 1 . . . N correspond to a Visited PLMN (VPLMNs for the respective SIMs. A VPLMN is any PLMN that serves a given SIM other than a home PLMN. Generally, SIMs will camp on VPLMNs when home PLMNs are not currently available.

While the SIMs 1 . . . N are camped on the respective VPLMNs, the given UE will periodically determine whether home or higher-priority PLMNs are available for reselection. Accordingly, in 405B, the given UE determines to execute a periodic PLMN reselection procedure. The periodic PLMN reselection procedure is similar in certain respects to the camping procedure described above with respect to FIG. 4A. For example, similar to the camping procedure described above with respect to FIG. 4A, the periodic PLMN reselection procedure is performed in an iterative or sequential manner for each of SIMs 1 . . . N, and begins with a PLMN scan for SIM 1.

Accordingly, the given UE scans one or more bands within its local wireless environment for signals advertising PLMNs that are associated with SIM 1 among SIMs 1 . . . N, 410B (e.g., as in 405A of FIG. 4A). After scanning the given set of bands for SIM 1, the given UE determines whether any PLMNs were detected that have a higher-priority than a current PLMN upon which SIM 1 is camped, 415B. If the given UE determines that no higher-priority PLMNs are detected for SIM 1 in 415B, the process advances directly to 430B. Otherwise, if the given UE determines that at least one higher-priority PLMN is detected for SIM 1 in 415B, the given UE selects one of the detected higher-priority PLMNs on which to attempt camping for SIM 1, 420B.

After selecting the higher-priority PLMN in 420B, assume that the given UE successfully camps SIM 1 on the selected higher-priority PLMN, 425B. While not shown explicitly in FIG. 4B, the camping procedure in 425B can include selecting a cell within the selected higher-priority PLMN on which to camp for SIM 1, sending a location update to the selected higher-priority PLMN and/or other camping operations. Further, while not shown explicitly in FIG. 4B, once SIM 1 is successfully camped on the higher-priority PLMN, the connection of SIM 1 to its previous PLMN or VPLMN can be dropped or uncamped.

Next, the iterative camping procedure for SIMs 1 . . . N continues with respect to the next SIM, which in this case is SIM 2. Accordingly, the given UE scans one or more bands within its local wireless environment for signals advertising PLMNs that are associated with SIM 2, 430B (e.g., as in 420A of FIG. 4A). After scanning the given set of bands for SIM 2, the given UE determines whether any PLMNs were detected that have a higher-priority than a current PLMN upon which SIM 2 is camped, 435B. If the given UE determines that no higher-priority PLMNs are detected for SIM 2 in 435B, the process advances directly to 450B. Otherwise, if the given UE determines that at least one higher-priority PLMN is detected for SIM 2 in 435B, the given UE selects one of the detected higher-priority PLMNs on which to attempt camping for SIM 2, 440B.

After selecting the higher-priority PLMN in 440B, assume that the given UE successfully camps SIM 2 on the selected higher-priority PLMN, 445B. While not shown explicitly in FIG. 4B, the camping procedure in 445B can include selecting a cell within the selected higher-priority PLMN on which to camp for SIM 2, sending a location update to the selected higher-priority PLMN and/or other camping operations. Further, while not shown explicitly in FIG. 4B, once SIM 2 is successfully camped on the higher-priority PLMN, the connection of SIM 2 to its previous PLMN or VPLMN can be dropped or uncamped.

After 445B, the given UE determines whether the periodic PLMN reselection procedure is to be applied to any additional SIMs among SIMs 1 . . . N, 450B. If the given UE determines to apply the periodic PLMN reselection procedure to one or more additional SIMs among SIMs 1 . . . N in 450B, the periodic PLMN reselection procedure for SIMs 1 . . . N continues by returning to 430B for the next SIM, which in this case is SIM 3. Otherwise, if the given UE determines to apply the periodic PLMN reselection procedure to one or more additional SIMs among SIMs 1 . . . N in 450B, the process of FIG. 4B terminates.

As will be appreciated from the description of FIG. 4B, the iterative manner in which bands are scanned to detect PLMNs for the plurality of SIMs 1 . . . N during the periodic PLMN reselection procedure can result in overlapping or redundant scans of bands for PLMNs, which increases delays associated with the periodic PLMN reselection and also increases power consumption by the given UE.

Embodiments of the invention are directed to reducing redundancy or overlap associated with scanning bands for PLMNs for a multi-SIM UE. As will be described in greater detail below, scanning bands to detect PLMNs in accordance with embodiments of the invention can be performed via scanning a combined band-range associated with each of SIMs 1 . . . N (e.g., in FIGS. 5A and/or 6A), or alternatively via an iterative scanning process that excludes searches within bands that have already been searched in an earlier iteration (e.g., as in FIGS. 5B and 6B).

Figure 5A:
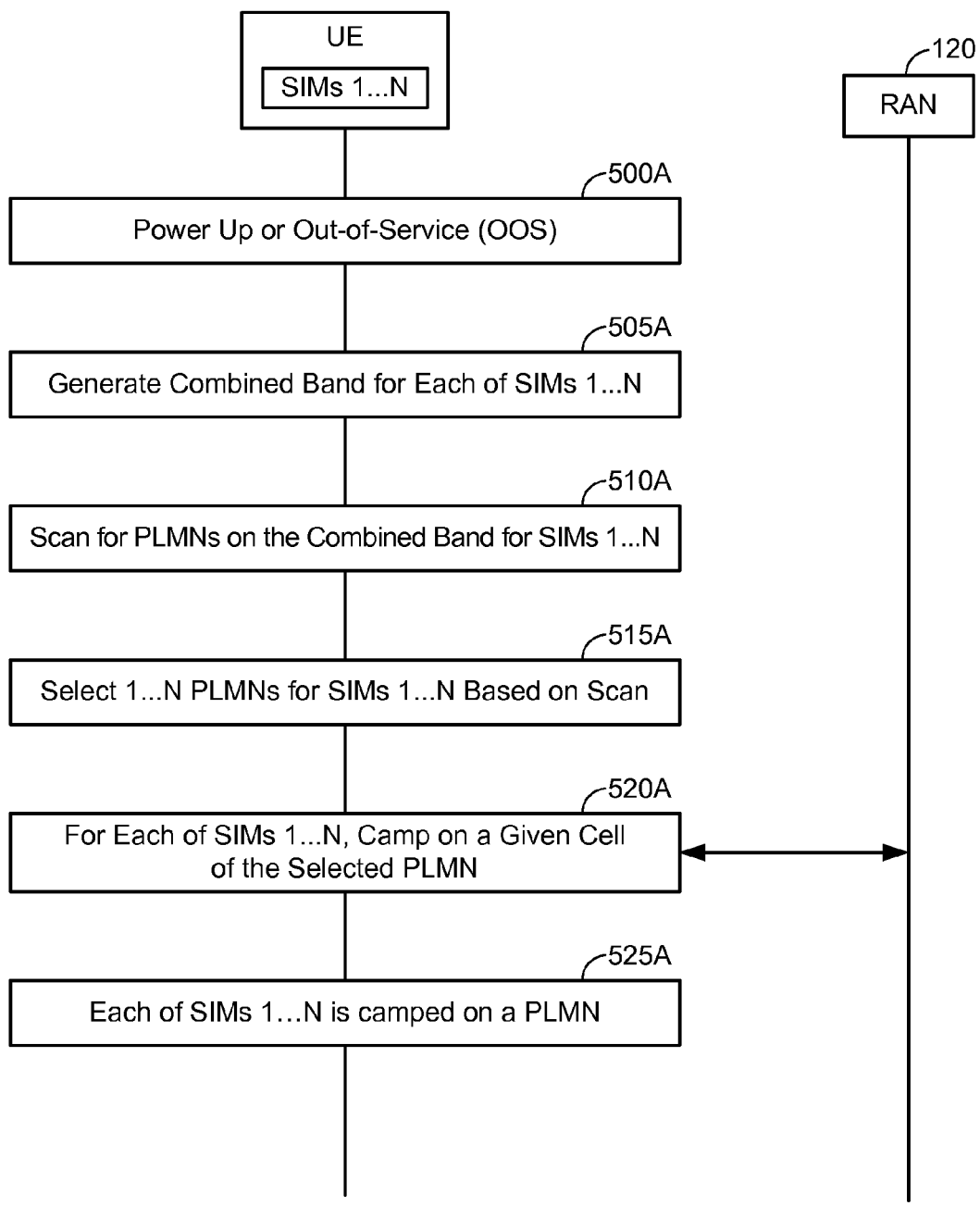
FIG. 5A illustrates a PLMN camping process for a UE provisioned with a plurality of SIMs in accordance with an embodiment of the invention.

Accordingly, FIG. 5A illustrates a PLMN camping process for a UE provisioned with a plurality of SIMs 1 . . . N in accordance with an embodiment of the invention. In the embodiment of FIG. 5A, assume that N>1. Referring to FIG. 5A, further assume that the UE enters into idle mode and that the UE is not currently camped on PLMN(s) of the RAN 120 for any of SIMs 1 . . . N, 500A. For example, the UE's entry into idle mode in 500A can be the result of an initial power-up procedure by the UE, or alternatively as a result of an Out-of-Service (OOS) condition (e.g., the UE loses contact with a current cell on which the UE was camped).

After 500A, the given UE initiates a camping procedure by which the given UE attempts to camp on a given cell of a given PLMN for each of SIMs 1 . . . N. Unlike FIG. 4A, the camping procedure in FIG. 5A is not performed in an iterative or sequential manner for each of SIMs 1 . . . N. Rather, in 505A, the given UE generates a 'combined' band (or band-range) for each of SIMs 1 . . . N. As an illustrative example, assume that N=3, that SIM 1 is associated with bands 1, 2 and 4, SIM 2 is associated with bands 2, 3 and 4 and SIM 3 is associated with bands 7 and 8. In this case, the combined band determined in 505A includes bands 1 through 4 and also bands 7 and 8. As will be shown below, the camping procedure of FIG. 5A scans each band within the combined band with a single scan-iteration. By contrast, under the same assumptions with respect to FIG. 4A, the overlap of bands 2 and 4 in association with SIMs 1 and 2 would result in a redundant scan of these bands. As discussed above, the set of bands associated with each particular SIM can be determined via query to a storage register within the non-volatile memory of the UE, in an example. The set of bands for SIMs 1 . . . N can be provisioned per subscription (i.e., or per-SIM) in the non-volatile memory of the UE by the carriers, e.g., during or after activation of a particular SIM. The respective carriers for SIMs 1 . . . N can either provision the respective SIMs with different sets of bands (although the bands could overlap somewhat), or with identical sets of bands (in which case 'combining' the sets of bands will result in the same set of bands).

Accordingly, in 510A of FIG. 5A, the given UE scans the combined band within its local wireless environment for signals advertising PLMNs. For example, 510A can include the given UE scanning or monitoring the combined band in an attempt to detect PLMN IDs that are indicative of available PLMNs for SIMs 1 . . . N. As will be appreciated, any results (or identified PLMNs) from the scan of 510A can be validated based on a timer or counter.

After scanning the combined band in 510A, the given UE selects one of the detected PLMNs on which to attempt camping for each of SIMs 1 . . . N, 515A. The PLMNs that are selected in 515A can be selected either manually or automatically, according to a predefined order of priorities. In an example, the manner in which the PLMNs are selected can vary from SIM to SIM, such that different PLMNs are selected for different SIMs. In another example, the same PLMN can be selected for two or more of SIMs 1 . . . N in 515A. For example, for one or more of SIMs 1 . . . N, instead of simply selecting the PLMN having a pilot or beacon signal with the highest signal strength, the given UE can be configured to select a PLMN by searching for PLMNs in a particular order (e.g., first CDMA, then EV-DO, etc.) and selecting the first PLMN, in the predefined order, that satisfies a threshold level of signal strength and/or cell quality.

In a further example, it will be appreciated that, for any particular SIM, the combined band can include bands that are not provisioned to the particular SIM by the carrier. In this case, the PLMN for the particular SIM is restricted to the particular SIM's own set of bands. Thus, if the combined band corresponds to bands 1 through 10, and the set of bands for the particular SIM corresponds to bands 1 through 4, then the PLMN selected for the particular SIM in 515A will be selected from a PLMN identified on bands 1 through 4, even though bands 5 through 10 were also searched during the 'combined' PLMN band-scan.

After selecting the PLMNs for SIMs 1 . . . N in 515A, assume that the given UE successfully camps each of SIMs 1 . . . N on their respective, selected PLMN, 520A. While not shown explicitly in FIG. 5A, the camping procedure in 520A can include selecting a cell within each selected PLMN on which to camp the associated SIM, sending a location update to the selected PLMN for each SIM and/or other camping operations. After 520A, as shown at 525A, the camping procedure with respect to SIMs 1 . . . N is complete and each of SIMs 1 . . . N is successfully camped on their respective, selected PLMN from 515A.

As will be appreciated from the description of FIG. 5A, the combined search for each band associated with SIMs 1 . . . N in 510A reduces the redundancy associated with band-searches for PLMN detection as discussed above with respect to FIG. 4A. The reduction of the redundancy results in both time-savings for the camping procedure illustrated in FIG. 5A, as well as power-consumption savings at the given UE.

Figure 5B:
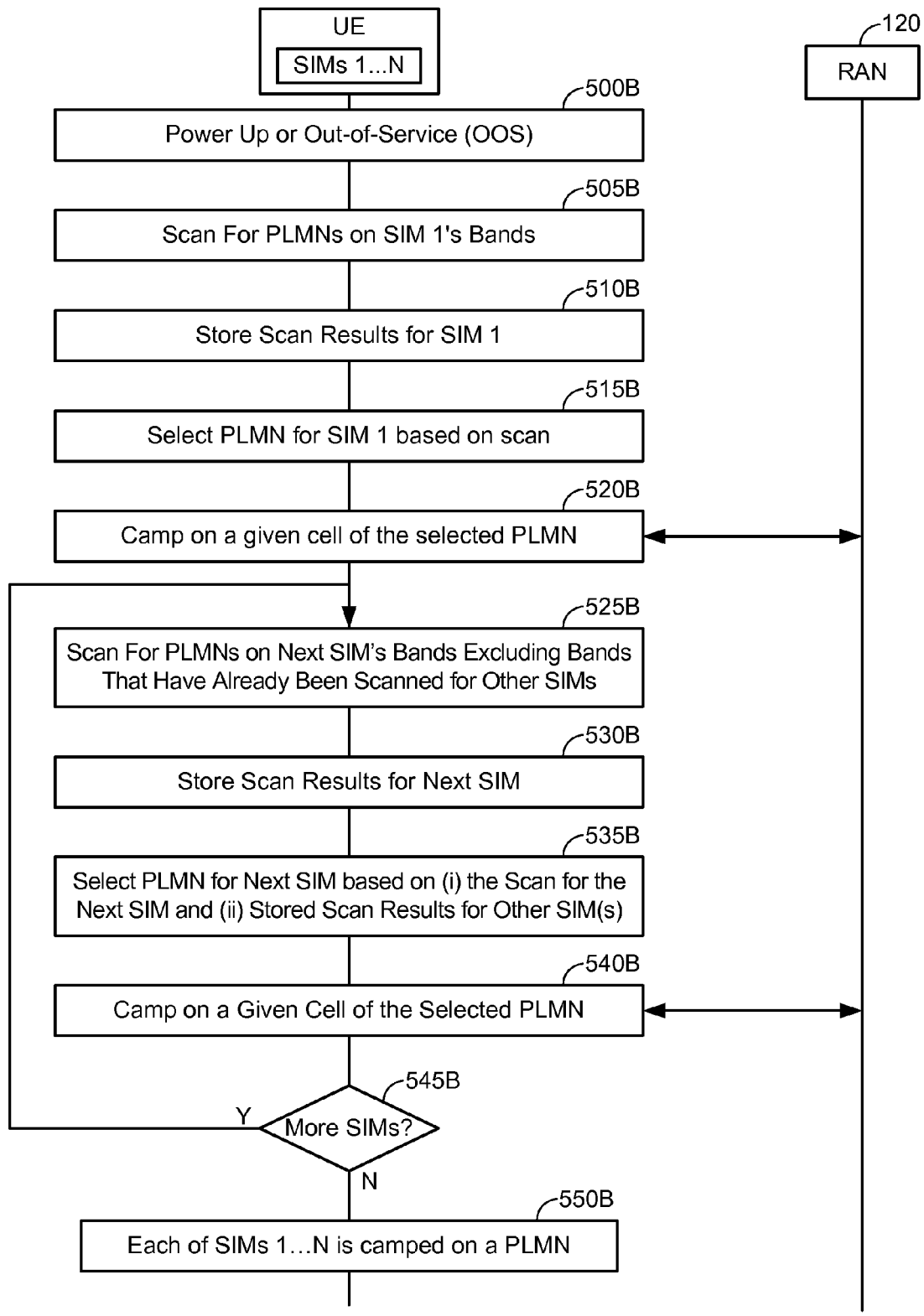
FIG. 5B illustrates a PLMN camping process for a UE provisioned with a plurality of SIMs in accordance with another embodiment of the invention.

FIG. 5B illustrates a PLMN camping process for a UE provisioned with a plurality of SIMs 1 . . . N in accordance with another embodiment of the invention. In the embodiment of FIG. 5B, assume that N>1. Referring to FIG. 5B, further assume that the UE enters into idle mode and that the UE is not currently camped on PLMN(s) of the RAN 120 for any of SIMs 1 . . . N, 500B. For example, the UE's entry into idle mode in 500B can be the result of an initial power-up procedure by the UE, or alternatively as a result of an Out-of-Service (OOS) condition (e.g., the UE loses contact with a current cell on which the UE was camped).

After 500B, the given UE initiates a camping procedure by which the given UE attempts to camp on a given cell of a given PLMN for each of SIMs 1 . . . N. Unlike FIG. 5A, the camping procedure is not performed in a 'combined' manner, but rather an iterative or sequential manner for each of SIMs 1 . . . N. However, the iterative or sequential implementation of the camping procedure in FIG. 5B differs from the conventional process described above with respect to FIG. 4A.

Accordingly, the given UE scans one or more bands within its local wireless environment for signals advertising PLMNs that are associated with SIM 1 among SIMs 1 . . . N, 505B. As discussed above, in an example, the one or more bands for SIM 1 can be obtained provisioned at the UE by a given carrier within non-volatile memory during or after activation of SIM 1. As will be appreciated, any results (or identified PLMNs) from the scan of 505B can be validated based on a timer or counter. After obtaining the scan-results in 505B (e.g., such as a list of detected PLMN-IDs that are indicative of available PLMNs), the given UE stores the scan-results for the bands searched in 505B for SIM 1 in a scan-result file or register, 510B. In an example, the scan-result file or register includes a list of bands that have been searched thus far during the camping procedure (e.g., bands 1, 2, 4 and 6) as well a list of PLMN-IDs detected in each of the scanned-bands (e.g., PLMN-ID #1 detected in band 1, PLMN-ID #7 detected in band 2, etc.).

After storing the scan-results in 510B, the given UE selects one of the detected PLMNs on which to attempt camping for SIM 1, 515B. The PLMN that is selected in 515B can be selected either manually or automatically, according to a predefined order of priorities. For example, instead of simply selecting the PLMN having a pilot or beacon signal with the highest signal strength, the given UE can be configured to select a PLMN by searching for PLMNs in a particular order (e.g., first CDMA, then EV-DO, etc.) and selecting the first PLMN, in the predefined order, that satisfies a threshold level of signal strength and/or cell quality. After selecting the PLMN in 515B, assume that the given UE successfully camps SIM 1 on the selected PLMN, 520B. While not shown explicitly in FIG. 5B, the camping procedure in 520B can include selecting a cell within the selected PLMN on which to camp for SIM 1, sending a location update to the selected PLMN and/or other camping operations.

After 520B, the camping procedure with respect to SIM 1 is complete and SIM 1 is successfully camped on the selected PLMN from 515B. Accordingly, the iterative camping procedure for SIMs 1 . . . N continues with respect to the next SIM, which in this case is SIM 2.

Accordingly, if necessary, the given UE scans one or more bands within its local wireless environment for signals advertising PLMNs that are associated with SIM 2 excluding the band(s) that were already searched in an earlier iteration of the camping procedure (i.e., in this case, at 505B for SIM 1), 525B. As discussed above, in an example, the one or more bands for SIM 2 can be provisioned at the UE by a given carrier within non-volatile memory during or after activation of SIM 2. As will be appreciated, any results (or identified PLMNs) from the scan of 530B can be validated based on a timer or counter. For example, in 525B, the given UE can determine the set of bands associated with SIM 2, load the list of bands that have already been searched earlier in the camping procedure from the scan-result file or register, remove any overlapping bands from the set of bands to be searched and then perform the PLMN scan for the 'reduced' set of bands. As will be appreciated, if SIM 2 is associated with a set of bands that overlap in part with SIM 1's set of bands, the scan at 525B can be reduced in scope. Further, if SIM 2 is associated with a set of bands that are each contained in SIM 1's set of bands, the scan at 525B can be skipped entirely. If the set of bands for SIM 2 does not overlap with the set of bands for SIM 1, then the PLMN scan within the set of bands for SIM 2 is performed in a 'normal' or non-reduced manner.

After obtaining the scan-results for SIM 2's non-overlapping band(s) in 525B (e.g., such as a list of detected PLMN-IDs that are indicative of available PLMNs in SIM 2's non-overlapping band(s)), the given UE adds the scan-results for SIM 2's non-overlapping bands to the scan-result file or register, 530B. Thus, if N>2 and the iterative camping procedure will be applied to additional SIM(s), the subsequent band-scans for SIMs 3 . . . N can be further reduced.

Referring to FIG. 5B, the given UE selects one of the detected PLMNs on which to attempt camping for SIM 2, 535B. As will be appreciated, the selection of 535B can be based upon both (i) the detected PLMNs listed in the scan-result file or register for previous SIM(s) and/or (ii) PLMNs detected by the scan conducted at 525B for SIM 2 (if the scan of 525B is performed). Aside from the manner in which the given UE populates the list of PLMNs that are available for selection, the selection of 535B for SIM 2 can be similar to the selection of 515B for SIM 1. However, it is also possible that SIMs 1 and 2 can each be associated with different SIM-specific PLMN-selection rules. Also, it will be appreciated that SIM 2 (as well as other SIMs among SIMS 1 . . . n) is restricted to its own particular set of bands. As will be appreciated, it is possible that SIM 1 includes bands that are not included in SIM 2's set of bands. In this case, while the results for SIM 1's exclusive bands can be stored in the scan-result file or register, these results will be ignored during the PLMN selection procedure for SIM 2 in 535B. Thus, if SIM 1's set of bands includes bands 1 through 10, and the set of bands for SIM 2 corresponds to bands 1 through 4, then the PLMN selected for SIM 2 in 535B will be selected from a PLMN identified on bands 1 through 4, even though results for bands 5 through 10 are also within the scan-result file or register. Also, because bands 1 through 4 would have been scanned for SIM 1 at 505B, the scanning operation at 525B for SIM 2 can be skipped entirely in this example.

After selecting the PLMN in 535B for SIM 2, assume that the given UE successfully camps SIM 2 on the selected PLMN, 540B. While not shown explicitly in FIG. 5B, the camping procedure in 540B can include selecting a cell within the selected PLMN on which to camp for SIM 2, sending a location update to the selected PLMN and/or other camping operations. After 540B, the given UE determines whether any additional SIMs among SIMs 1 . . . N require camping, 545B. If the given UE determines that one or more additional SIMs among SIMs 1 . . . N require camping in 545B, the iterative camping procedure for SIMs 1 . . . N continues by returning to 525B for the next SIM, which in this case is SIM 3. Otherwise, if the given UE determines that no additional SIMs among SIMs 1 . . . N require camping in 545B, then each of SIMs 1 . . . N is camped on a respective PLMN, 550B.

As will be appreciated from the description of FIG. 5B, the reduced-scope of bands to be searched during later iterations of the camping procedure reduces the redundancy associated with band-searches for PLMN detection as discussed above with respect to FIG. 4A. The reduction of the redundancy results in both time-savings for the camping procedure illustrated in FIG. 5B, as well as power-consumption savings at the given UE.

While FIGS. 5A and 5B each describe a process relating to a camping procedure for SIMs 1 . . . N upon PLMNs when the SIMs 1 . . . N are not yet camped on any PLMN, it will be appreciated that the given UE can continue to scan for PLMNs even when SIMs 1 . . . N are each already camped on PLMN(s). Accordingly, FIGS. 6A and 6B each illustrate a PLMN reselection process for a UE provisioned with a plurality of SIMs 1 . . . N in accordance with embodiments of the invention.

Figure 6A:
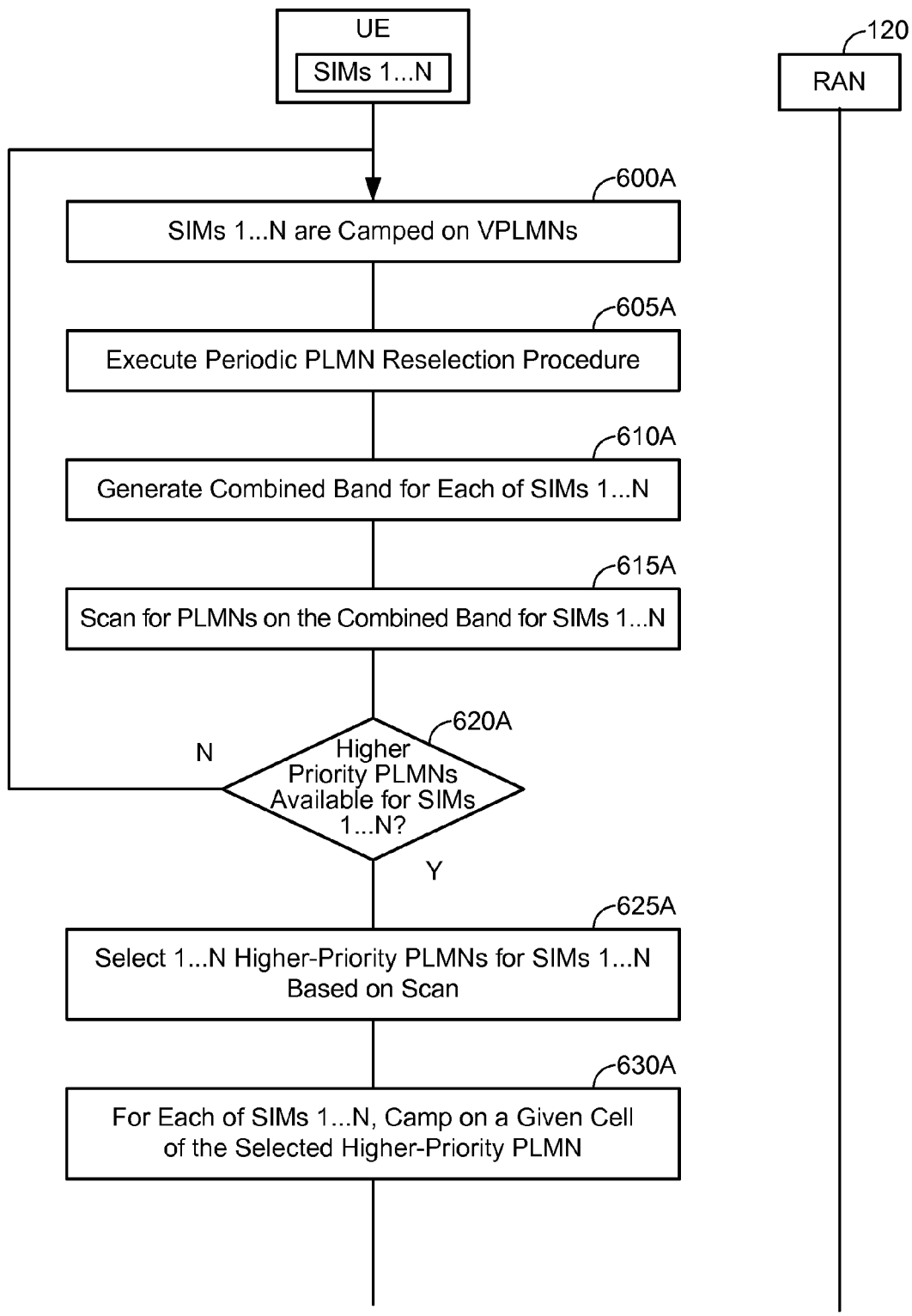
FIGS. 6A and 6B each illustrate a PLMN reselection process for a UE provisioned with a plurality of SIMs in accordance with embodiments of the invention.

Referring to FIG. 6A, as in FIG. 4B, assume that the UE is currently camped on PLMNs of the RAN 120 for each of SIMs 1 . . . N, 600A. Also, in 600A, further assume that each of the PLMNs on which SIMs 1 . . . N corresponds to a Visited PLMN (VPLMN) for the respective SIMs. As discussed above, a VPLMN is any PLMN that serves a given SIM other than a home PLMN. Generally, SIMs will camp on VPLMNs when home PLMNs are not currently available. While FIG. 6A is directed to an example whereby each of SIMs 1 . . . N are camped on VPLMNs, it will be appreciated that other embodiments can be directed to implementations whereby at least one and less than all of SIMs 1 . . . N are camped on VPLMNs. In this case, the processes described below with respect to each of SIMs 1 . . . N can instead be applied only with respect to the SIMs that are actually camped on VPLMNs (e.g., the combined scanning procedure described below with respect to FIG. 6A can correspond to a merged set of bands only for SIMs that are camped on VPLMNs, etc.).

While the SIMs 1 . . . N are camped on the respective VPLMNs, the given UE will periodically determine whether home or higher-priority PLMNs are available for reselection. Accordingly, in 605A, the given UE determines to execute a periodic PLMN reselection procedure. The periodic PLMN reselection procedure of FIG. 6A is similar in certain respects to the camping procedure described above with respect to FIG. 5A. For example, similar to the camping procedure described above with respect to FIG. 5A, the periodic PLMN reselection procedure is performed based on a 'combined' band for SIMs 1 . . . N.

Referring to FIG. 6A, the given UE generates a 'combined' band (or band-range) for each of SIMs 1 . . . N, 610A. As an illustrative example, assume that N=3, that SIM 1 is associated with bands 1, 2 and 4, SIM 2 is associated with bands 2, 3 and 4 and SIM 3 is associated with bands 7 and 8. In this case, the combined band determined in 610A includes bands 1 through 4 and also bands 7 and 8. As will be shown below, the periodic PLMN reselection procedure of FIG. 6A scans each band within the combined band with a single scan-iteration. By contrast, under the same assumptions with respect to FIG. 4B, the overlap of bands 2 and 4 in association with SIMs 1 and 2 would result in a redundant scan of these bands. As discussed above, the set of bands associated with each particular SIM can be determined via query to a storage register within the non-volatile memory of the UE. The set of bands for SIMs 1 . . . N can be provisioned per subscription (i.e., or per-SIM) in the non-volatile memory of the UE by the carriers, e.g., during or after activation of a particular SIM. The respective carriers for SIMs 1 . . . N can either provision the respective SIMs with different sets of bands (although the bands could overlap somewhat), or with identical sets of bands.

Accordingly, in 615A of FIG. 6A, the given UE scans the combined band within its local wireless environment for signals advertising PLMNs. As will be appreciated, any results (or identified PLMNs) from the scan of 615A can be validated based on a timer or counter. For example, 615A can include the given UE scanning or monitoring the combined band in an attempt to detect PLMN IDs that are indicative of available PLMNs for SIMs 1 . . . N.

After scanning the combined band in 615A, the given UE determines, for each of SIMs 1 . . . N, whether any PLMNs were detected that have a higher-priority (and also satisfy threshold levels of signal strength and/or cell quality) than a current PLMN upon which the respective SIM is camped, 620A. If the given UE determines, for each of SIMs 1 . . . N, that no higher-priority PLMNs are detected for the respective SIM in 620A, the process returns to 600A until the given UE determines to execute a next periodic PLMN reselection procedure. Otherwise, if the given UE determines that at least one higher-priority PLMN is detected for one or more of SIMs 1 . . . N in 620A, the given UE selects one of the detected higher-priority PLMNs on which to attempt camping for the one or more of SIMs 1 . . . N, 625A. As will be appreciated, it is possible that the one or more of SIMs 1 . . . N for which the higher-priority PLMN(s) are detected can correspond to less than all of SIMs 1 . . . N.

In a further example, it will be appreciated that, for any particular SIM, the combined band can include bands that are not provisioned to the particular SIM by the carrier. In this case, the PLMN for the particular SIM is restricted to the particular SIM's own set of bands. Thus, if the combined band corresponds to bands 1 through 10, and the set of bands for the particular SIM corresponds to bands 1 through 4, then the PLMN selected for the particular SIM in 515A will be selected from a PLMN identified on bands 1 through 4, even though bands 5 through 10 were also searched during the 'combined' PLMN band-scan. In other words, higher-priority PLMNs for the particular SIM would be ignored if detected in bands outside the particular SIM's set of bands.

After selecting the PLMN(s) in 625A, assume that the given UE successfully camps each of the one or more of SIMs 1 . . . N on their respective, selected higher-priority PLMN(s) in 630A. While not shown explicitly in FIG. 6A, the camping procedure in 630A can include selecting a cell within each selected higher-priority PLMN on which to camp the associated SIM, sending a location update to the selected higher-priority PLMN for each SIM and/or other camping operations.

As will be appreciated from the description of FIG. 6A, the combined search of each band associated with SIMs 1 . . . N in 615A reduces the redundancy associated with band-searches for PLMN detection as discussed above with respect to FIG. 4B. The reduction of the redundancy results in both time-savings for the periodic PLMN reselection procedure illustrated in FIG. 6A, as well as power-consumption savings at the given UE.

Figure 6B:
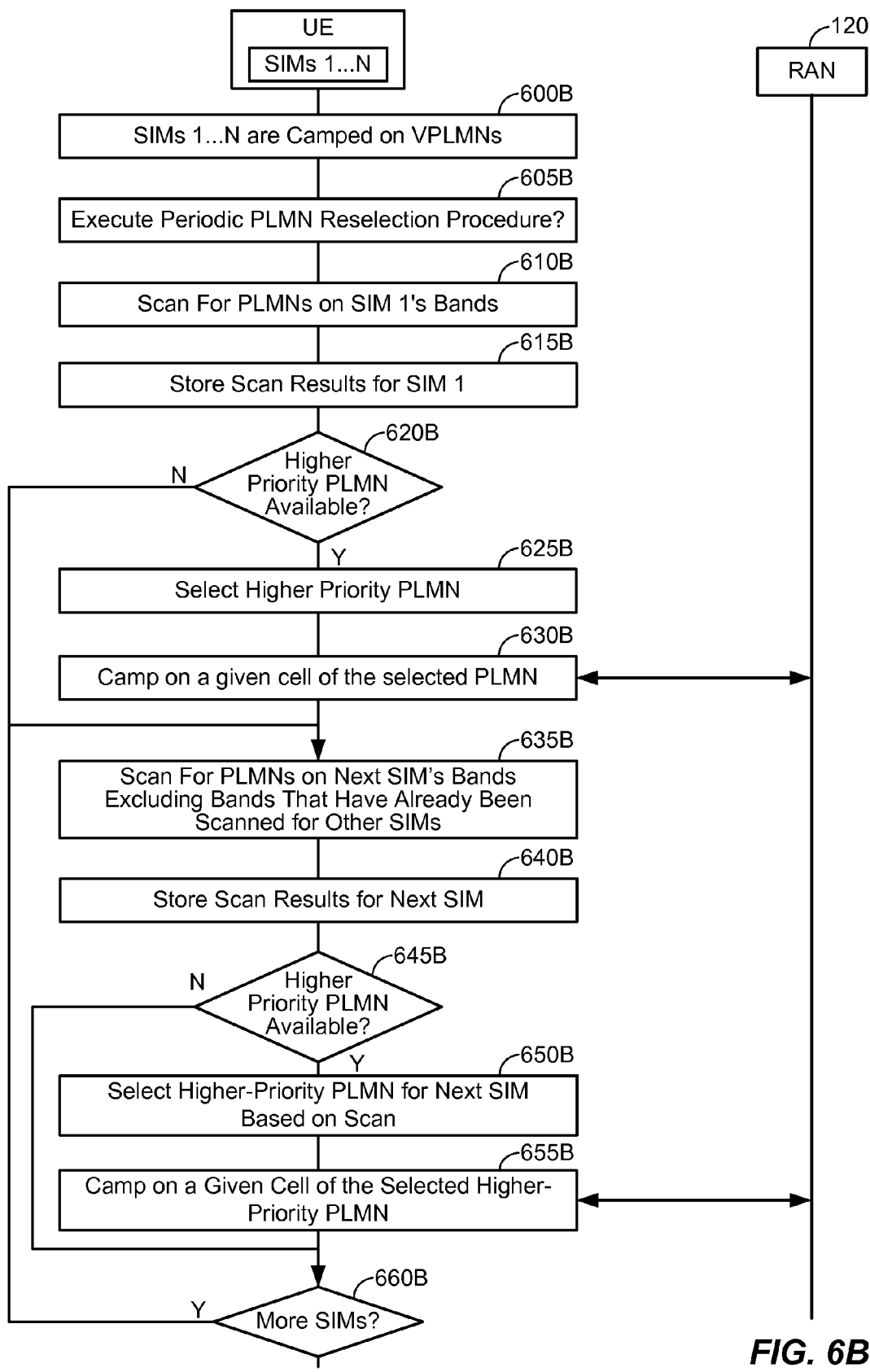

FIG. 6B illustrates a PLMN reselection process for a UE provisioned with a plurality of SIMs 1 . . . N in accordance with another embodiment of the invention. Referring to FIG. 6B, as in FIG. 6A, assume that N>1 and that the UE is currently camped on PLMNs of the RAN 120 for each of SIMs 1 . . . N, 600B. Also, in 600B, further assume that each of the PLMNs on which SIMs 1 . . . N corresponds to a VPLMN for the respective SIMs. As discussed above, a VPLMN is any PLMN that serves a given SIM other than a home PLMN. Generally, SIMs will camp on VPLMNs when home PLMNs are not currently available. While FIG. 6B is directed to an example whereby each of SIMs 1 . . . N are camped on VPLMNs, it will be appreciated that other embodiments can be directed to implementations whereby at least one and less than all of SIMs 1 . . . N are camped on VPLMNs. In this case, the processes described below with respect to each of SIMs 1 . . . N can instead be applied only with respect to the SIMs that are actually camped on VPLMNs (e.g., the iterative scanning procedure described below with respect to FIG. 6B can be skipped for SIMs already camped on home PLMNs).

While the SIMs 1 . . . N are camped on the respective VPLMNs, the given UE will periodically determine whether home or higher-priority PLMNs are available for reselection. Accordingly, in 605B, the given UE determines to execute a periodic PLMN reselection procedure. The periodic PLMN reselection procedure of FIG. 6B is similar in certain respects to the camping procedure described above with respect to FIG. 5B. For example, similar to the camping procedure described above with respect to FIG. 5B, the periodic PLMN reselection procedure is performed in an iterative manner for SIMs 1 . . . N, whereby duplicative band-scans are reduced or avoided.

Accordingly, the given UE scans one or more bands within its local wireless environment for signals advertising PLMNs that are associated with SIM 1 among SIMs 1 . . . N, 610B. As discussed above, in an example, the one or more bands for SIM 1 can be obtained provisioned at the UE by a given carrier within non-volatile memory during or after activation of SIM 1. As will be appreciated, any results (or identified PLMNs) from the scan of 610B can be validated based on a timer or counter.

After obtaining the scan-results in 610B (e.g., such as a list of detected PLMN-IDs that are indicative of available PLMNs), the given UE stores the scan-results for the bands searched in 610B for SIM 1 in a scan-result file or register, 615B. In an example, the scan-result file or register includes a list of bands that have been searched thus far during the periodic PLMN reselection procedure (e.g., bands 1, 2, 4 and 6) as well a list of PLMN-IDs detected in each of the scanned-bands (e.g., PLMN-ID #1 detected in band 1, PLMN-ID #7 detected in band 2, etc.).

Referring to FIG. 6B, the given UE determines whether any PLMNs were detected that have a higher-priority (and also satisfy threshold levels of signal strength and/or cell quality) than a current PLMN upon which SIM 1 is camped, 620B. If the given UE determines that no higher-priority PLMNs are detected for SIM 1 in 620B, the process advances directly to 635B. Otherwise, if the given UE determines that at least one higher-priority PLMN is detected for SIM 1 in 620B, the given UE selects one of the detected higher-priority PLMNs on which to attempt camping for SIM 1, 625B. The PLMN that is selected in 625B can be selected either manually or automatically, according to a predefined order of priorities. For example, instead of simply selecting the PLMN having a pilot or beacon signal with the highest signal strength, the given UE can be configured to select a PLMN by searching for PLMNs in a particular order (e.g., first CDMA, then EV-DO, etc.) and selecting the first PLMN, in the predefined order, that satisfies a threshold level of signal strength and/or cell quality. After selecting the PLMN in 625B, assume that the given UE successfully camps SIM 1 on the selected PLMN, 630B. While not shown explicitly in FIG. 6B, the periodic PLMN reselection procedure in 630B can include selecting a cell within the selected PLMN on which to camp for SIM 1, sending a location update to the selected PLMN and/or other camping operations.

After the decision block 620B determines that no higher-priority PLMNs are available for SIM 1 or SIM 1 is successfully camped on the higher-priority PLMN in 630B, the iterative camping procedure for SIMs 1 . . . N continues with respect to the next SIM, which in this case is SIM 2.

Accordingly, if necessary, the given UE scans one or more bands within its local wireless environment for signals advertising PLMNs that are associated with SIM 2 excluding the band(s) that were already searched in an earlier iteration of the camping procedure (i.e., in this case, at 610B for SIM 1), 635B. As discussed above, in an example, the one or more bands for SIM 2 can be provisioned at the UE by a given carrier within non-volatile memory during or after activation of SIM 2. As will be appreciated, any results (or identified PLMNs) from the scan of 635B can be validated based on a timer or counter. For example, in 635B, the given UE can determine the set of bands associated with SIM 2, load the list of bands that have already been searched earlier in the camping procedure from the scan-result file or register, remove any overlapping bands from the set of bands to be searched and then perform the PLMN-search within any remaining non-overlapping bands. As will be appreciated, if SIM 2 is associated with a set of bands that overlap in part with SIM 1's set of bands, the scan at 635B can be reduced in scope. Further, if SIM 2 is associated with a set of bands that are each contained in SIM 1's set of bands, the scan at 635B can be skipped entirely. If the set of bands for SIM 2 does not overlap with the set of bands for SIM 1, then the PLMN scan within the set of bands for SIM 2 is performed in a 'normal' or non-reduced manner.

After obtaining the scan-results for SIM 2's non-overlapping band(s) in 635B (e.g., such as a list of detected PLMN-IDs that are indicative of available PLMNs in SIM 2's non-overlapping band(s)), the given UE adds the scan-results for SIM 2's non-overlapping bands to the scan-result file or register, 640B. Thus, if N>2 and the iterative camping procedure will be applied to additional SIM(s), the subsequent band-scans for SIMs 3 . . . N can be further reduced.

Referring to FIG. 6B, the given UE determines whether any PLMNs were detected that have a higher-priority than a current PLMN upon which SIM 2 is camped, 645B. If the given UE determines that no higher-priority PLMNs are detected for SIM 2 in 645B, the process advances directly to 660B. Otherwise, if the given UE determines that at least one higher-priority PLMN is detected for SIM 2 in 645B, the given UE selects one of the detected higher-priority PLMNs on which to attempt camping for SIM 2, 650B. As will be appreciated, the selection of 650B can be based upon both (i) the detected PLMNs listed in the scan-result file or register for previous SIM(s) and/or (ii) PLMNs detected by the scan conducted at 640B for SIM 2 (if the scan of 640B is performed). Aside from the manner in which the given UE populates the list of PLMNs that are available for selection, the selection of 650B for SIM 2 can be similar to the selection of 625B for SIM 1. However, it is also possible that SIMs 1 and 2 can each be associated with different SIM-specific PLMN-selection rules. Also, it will be appreciated that SIM 2 (as well as other SIMs among SIMS 1 . . . n) is restricted to its own particular set of bands. As will be appreciated, it is possible that SIM 1 includes bands that are not included in SIM 2's set of bands. In this case, while the results for SIM 1's exclusive bands can be stored in the scan-result file or register, these results will be ignored during the PLMN reselection procedure for SIM 2 in 650B. Thus, if SIM 1's set of bands includes bands 1 through 10, and the set of bands for SIM 2 corresponds to bands 1 through 4, then the higher-priority PLMN selected for SIM 2 in 650B will be selected from a higher-priority PLMN identified on bands 1 through 4, even though results for bands 5 through 10 can also be within the scan-result file or register. Also, because bands 1 through 4 would have been scanned for SIM 1 at 610B, the scanning operation at 525B for 635B can be skipped entirely in this example.

After selecting the PLMN in 650B, assume that the given UE successfully camps SIM 2 on the selected PLMN, 655B. While not shown explicitly in FIG. 6B, the periodic PLMN reselection procedure in 655B can include selecting a cell within the selected PLMN on which to camp for SIM 2, sending a location update to the selected PLMN and/or other camping operations. After 655B, the given UE determines whether to apply the periodic PLMN reselection procedure to any additional SIMs among SIMs 1 . . . N, 660B. If the given UE determines to apply the periodic PLMN reselection procedure to any additional SIMs in 660B, the iterative periodic PLMN reselection procedure for SIMs 1 . . . N continues by returning to 635B for the next SIM, which in this case is SIM 3. Otherwise, if the given UE determines not to apply the periodic PLMN reselection procedure to any additional SIMs in 660B, the process terminates.

As will be appreciated from the description of FIG. 6B, the reduced-scope of band-searches during the iterative periodic PLMN reselection procedure reduces the redundancy associated with band-searches for PLMN detection as discussed above with respect to FIG. 4B. The reduction of the redundancy results in both time-savings for the periodic PLMN reselection procedure illustrated in FIG. 6B, as well as power-consumption savings at the given UE.

While references in the above-described embodiments of the invention have generally used the terms 'call' and 'session' interchangeably, it will be appreciated that any call and/or session is intended to be interpreted as inclusive of actual calls between different parties, or alternatively to data transport sessions that technically may not be considered as 'calls'. Also, while above-embodiments have generally described with respect to PTT sessions, other embodiments can be directed to any type of communication session, such as a push-to-transfer (PTX) session, an emergency VoIP call, etc.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of searching for a set of networks upon which to camp at a wireless communications device including a plurality of subscriber identity modules (SIMs), comprising:
   determining a first set of bands that is associated with a first of the plurality of SIMs;
   determining a second set of bands that is associated with a second of the plurality of SIMs;
   generating a combined band that includes at least the first set of bands and the second set of bands; and
   scanning the combined band to detect a set of target networks for camping in association with at least the first and second SIMs.

2. The method of claim 1, wherein the scanning step is performed in response to an initial power-up of the wireless communications device.

3. The method of claim 1, wherein the scanning step is performed in response to an Out-of-Service (OOS) condition at the wireless communications device.

4. The method of claim 1, further comprising:
   selecting one of the detected set of target networks for the first SIM based on the scanning step; and
   attempting to camp the first SIM on the selected target network.

5. The method of claim 4, wherein the selecting step is restricted to selecting the selected target network from among the first set of bands.

6. The method of claim 1, further comprising:
   selecting one of the detected set of target networks for the second SIM based on the scanning step; and
   attempting to camp the second SIM on the selected target network.

7. The method of claim 6, wherein the selecting step is restricted to selecting the selected target network from among the second set of bands.

8. The method of claim 1, wherein, prior to the scanning step, the first and second SIMs are already camped on lower-priority networks.

9. The method of claim 8, wherein the lower-priority networks are Visited Public Land Mobile Networks (VPLMNs) of the first and second SIMs.

10. The method of claim 8, further comprising:
    determining whether the detected set of target networks includes one or more higher-priority networks relative to the first SIM and/or the second SIM.

11. The method of claim 10, further comprising:
    if the detected set of target networks is determined to include one or more higher-priority networks relative to the first SIM,
        selecting one of the one or more higher-priority networks for the first SIM, and
        attempting to camp the first SIM on the selected higher-priority network.

12. The method of claim 11, wherein the selecting step is restricted to selecting the selected higher-priority network from among the first set of bands.

13. The method of claim 10, further comprising:
if the detected set of target networks is determined to include one or more higher-priority networks relative to the second SIM,
selecting one of the one or more higher-priority networks for the second SIM, and
attempting to camp the second SIM on the selected higher-priority network.

14. The method of claim 13, wherein the selecting step is restricted to selecting the selected higher-priority network from among the second set of bands.

15. The method of claim 1, wherein the detected set of target networks corresponds to one or more Public Land Mobile Networks (PLMNs).

16. A method of searching for a set of networks upon which to camp at a wireless communications device including a plurality of subscriber identity modules (SIMs), comprising:
determining a first set of bands that is associated with a first of the plurality of SIMs;
scanning the first set of bands to detect a first set of target networks for camping in association with the first SEM;
determining a second set of bands that is associated with a second of the plurality of SIMs;
generating a modified second set of hands by excluding, from the second set of bands, one or more bands that overlap with the first set of hands; and
scanning the modified second set of bands to detect a second set of target networks for camping in association with the second SIM.

17. The method of claim 16, wherein the scanning of the first set of bands is performed in response to an initial power-up of the wireless communications device.

18. The method of claim 16, wherein the scanning of the first set of bands is performed in response to an Out-of-Service (OOS) condition at the wireless communications device.

19. The method of claim 16, further comprising:
selecting one of the first set of target networks; and
attempting to camp the first SIM on the selected target network.

20. The method of claim 19, wherein the selecting step is restricted to selecting the selected target network from among the first set of bands.

21. The method of claim 16, further comprising:
storing scan-results based on the scan of the first set of bands;
selecting a target network from among (i) the second set of target networks and (ii) the stored first set of target networks; and
attempting to camp the second SIM on the selected target network.

22. The method of claim 21, wherein the selecting step is restricted to selecting the selected target network from among the second set of bands, 23. The method of claim 16, wherein, prior to the scanning of the first set of bands, the first and second SIMs are already camped on lower-priority networks.

24. The method of claim 23, further comprising:
determining whether the first set of target networks includes one or more higher-priority networks relative to the first SIM; and
determining whether the first or second set of target networks includes one or more higher-priority networks relative to the second SIM.

25. The method of claim 24, further comprising;
if the first set of target networks is determined to include one or more higher-priority networks relative to the first SIM,
selecting one of the one or more higher-priority networks, and
attempting to camp the first SIM on the selected higher-priority network.

26. The method of claim 25, wherein the selecting step is restricted to selecting the selected higher-priority network from among the first set of bands.

27. The method of claim 24, further comprising:
if the first or second set of target networks is determined to include one or more higher-priority networks relative to the second SIM,
selecting one of the one or more higher-priority networks, and
attempting to camp the second SIM on the selected higher-priority network.

28. The method of claim 27, wherein the selecting step is restricted to selecting the selected higher-priority network from among the second set of bands.

29. The method of claim 16, further comprising:
storing scan-results based on the scan of the first set of bands;
storing scan-results based on the scan of the second set of bands;
determining a third set of bands that is associated with a third of the plurality of SIMs;
generating a modified third set of bands by excluding, from the third set of bands, one or more bands that overlap with the first set of bands and/or the second set of bands; and
scanning the modified third set of bands to detect a third set of target networks for camping in association with the third SIM.

30. The method of claim 16, wherein the first and second detected sets of target networks correspond to one or more Public Land Mobile Networks (PLMNs).

31. A wireless communications device including a. plurality of subscriber identity modules (SIMs) and configured to search for a set of networks upon which to camp, comprising:
means for determining a first set of bands that is associated with a first of the plurality of SIMs;
means for determining a second set of bands that is associated with a second of the plurality of SIMs;
means for generating a combined band that includes at least the first set of bands and the second set of bands; and
means for scanning the combined band to detect a set of target networks for camping in association with at least the first and second SIMs.

32. A wireless communications device including a plurality of subscriber identity modules (SIMs) and configured to search for a set of networks upon which to camp, comprising:
means for determining a first set of bands that is associated with a first of the plurality of SIMs;
means for scanning the first set of bands to detect a first set of target networks for camping in association with the first SIM;
means for determining a second set of bands that is associated with a second of the plurality of SIMs;
means for generating a modified second set of bands by excluding, from the second set of bands, one or more bands that overlap with the first set of bands; and means for scanning the modified second set of bands to detect a second set of target networks for camping in association with the second SIM.

33. A wireless communications device including, a plurality of subscriber identity modules (SIMs) and configured to search for a set of networks upon which to camp, comprising:
logic configured to determine a first set of bands that is associated with a first of the plurality of SIMs;
logic configured to determine a second set of bands that is associated with a second of the plurality of SIMs;
logic configured to generate a combined band that includes at least the first set of bands and the second set of bands; and
logic configured to scan the combined band to detect a set of target networks for camping in association with at least the first and second SIMs.

34. A wireless communications device including a plurality of subscriber identity modules (SIMs) and configured to search for a set of networks upon which to camp, comprising:
logic configured to determine a first set of bands that is associated with a first of the plurality of SIMs;
logic configured to scan the first set of bands to detect a first set of target networks for camping in association with the first SIM;
logic configured to determine a second set of bands that is associated with a second of the plurality of SIMs;
logic, configured to generate a modified second set of bands by excluding, from the second set of bands, one or More bands that overlap with the first set of bands; and
logic configured to scan the modified second set of bands to detect a second set of target networks for camping in association with the second SIM.

35. A non-transitory computer-readable storage medium containing instructions stored thereon, which, when executed by a wireless communications device including a plurality of subscriber identity modules (SIMs) and configured to search for a set of networks upon which to camp, cause the wireless communications device to perform operations, the instructions comprising:
program code to determine a first set of bands that is associated with a first of the plurality of SIMs;
program code to determine a second set of bands that is associated with a second of the plurality of SIMs;
program code to generate a combined band that includes at least the first set of bands and the second set of bands; and
program code to scan the combined band to detect a set of target networks for camping in association with at least the first and second SIMs.

36. A non-transitory computer-readable storage medium containing instructions stored thereon, which, when executed by a wireless communications device including a plurality of subscriber identity modules (SIMs) and configured to search for a set of networks upon which to camp, cause the wireless communications device to perform operations, the instructions comprising:
program code to determine as first set of bands that is associated with a first of the plurality of SIMs:
program code to scan the first set of bands to detect a first set of target networks for camping in association with the first SIM;
program code to determine, a second set of bands that is associated with a second of the plurality of SIMs;
program code to generate a modified second set of bands by excluding, from the second set of bands, one or more bands that overlap with the first set of bands; and
program code to scan the modified second set of bands to detect a second set of target networks for camping in association with the second SIM.

* * * * *